United States Patent
Kleinschmidt et al.

[15] 3,704,922
[45] Dec. 5, 1972

[54] INTERMEDIATE BEARING FOR SUPPORTING A DIVIDED LINE OF DRIVE SHAFTS IN A MOTOR VEHICLE

[72] Inventors: Hans-Joachim Kleinschmidt, Essen-Steele; Josef Schultenkampger, Essen, both of Germany

[73] Assignee: Gelenkwellenbau GmbH, Essen, Germany

[22] Filed: Aug. 31, 1970

[21] Appl. No.: 68,110

[30] Foreign Application Priority Data
Sept. 4, 1969    Germany..........P 19 44 919.5

[52] U.S. Cl....................................308/26, 308/184
[51] Int. Cl.................................................F16c 35/04
[58] Field of Search..............................308/26, 184

[56] References Cited

UNITED STATES PATENTS

| | | | |
|---|---|---|---|
| 3,384,429 | 5/1968 | Farrell et al. | 308/187.1 |
| 3,306,679 | 2/1967 | Stokely | 308/26 |
| 3,140,901 | 7/1964 | Young | 308/26 |

FOREIGN PATENTS OR APPLICATIONS

| | | | |
|---|---|---|---|
| 921,720 | 3/1963 | Great Britain | 308/26 |

*Primary Examiner*—Martin P. Schwadron
*Assistant Examiner*—Barry Grossman
*Attorney*—Curt M. Avery, Arthur E. Wilfond, Herbert L. Lerner and Daniel J. Tick

[57] ABSTRACT

Intermediate bearing for supporting a divided line of drive shafts between gearbox and driving axle of a motor vehicle includes an elastic ring supporting, in a bearing casing securable to the vehicle, a bearing holder ring, which accommodates a pair of packing rings and an inner bearing ring pressable onto a lay shaft of the divided line of shafts, the elastic ring being formed of elastomeric material for affording axial, radial and angular movements of the bearing holder ring relative to the bearing casing, the elastic ring being shaped as a tire having a substantially cylindrical main body enclosing the bearing holder ring and having at both axial ends thereof a respective ring of radially extending bracing projections prestressed by the bearing casing, and an annular rib located between the rings of bracing projections and being radially spaced from the casing.

7 Claims, 3 Drawing Figures

INTERMEDIATE BEARING FOR SUPPORTING A DIVIDED LINE OF DRIVE SHAFTS IN A MOTOR VEHICLE

The invention relates to an intermediate bearing for supporting a divided line of drive shafts between the gearbox and the driving axle of a motor vehicle.

Vehicles having a long wheelbase with a driving engine at the front thereof and driving wheels at the rear thereof, require a divided line of drive shafts to transmit power from gearbox to the rear wheel axles. The divided line of drive shafts has three joints of which the two rear joints are provided with sliding sleeve therebetween, and the part of the line of drive shafts which is the intermediate or so-called lay shaft is supported on the frame of the vehicle on the forward or input side of the middle joint by a so-called intermediate or middle bearing. With a view toward vibration engineering requirements, either the bearing casing of this intermediate bearing is secured to the vehicle frame through an elastic intermediate member, or the bearing is supported in the bearing casing through annular elastic intermediate members. In most cases, the actual bearing part of the intermediate bearing is a rolling friction bearing in the form of a ball bearing. Since the entire assembly comprising engine and gearbox is resiliently mounted in the vehicle and, when the latter is in motion, also carries out movements in the direction of the longitudinal axis of the vehicle, then with this construction of the intermediate bearing, the axial movements of the lay shaft must be absorbed by the elastic members in the intermediate bearing or the intermediate bearing support. However, these afford only a limited axial movement of the inner ring of the bearing with respect to the intermediate bearing support.

An intermediate bearing has also become known heretofore wherein the rolling friction bearing is a roller bearing having a cylindrical inner bearing ring which can be pressed onto the lay shaft and can move unhindered axially with respect to the rollers so that the intermediate bearing is capable of absorbing a relatively large axial length equalization. The roller bearing is housed together with two packing rings, which cooperate with the inner bearing ring to seal the bearing space for the roller bearing, in a bearing holder ring that is supported in the bearing casing by a radially prestressed rubber ring of circular cross-section. This rubber ring is inserted between a concave outer face of the bearing holding ring and a concave inner face of the bearing casing, so that the bearing holder ring with the roller bearing is elastically braced in a radial direction, but can nevertheless perform angular and axial movements with respect to the bearing casing, the axial movements being counteracted by a progressively increasing resistance due to the concave construction of the two faces which enclose the ring therebetween. The intermediate space between bearing holder ring and bearing casing, in which the elastic supporting ring is disposed, is sealed at the ends thereof by axially convex packing sleeves.

An object of the invention is to provide intermediate bearing for supporting a divided line of drive shafts in a motor vehicle with an elastic ring between the bearing holder ring and the bearing casing wherein the elastic ring is able to support small oscillation movements in a radial direction quite softly but provides harder support for relatively greater radial movements, while at the same time affording axial mobility as well as angular mobility of the bearing holder ring with respect to the bearing casing.

With the foregoing and other objects in view, we provide in accordance with out invention, intermediate bearing for supporting a divided line of drive shafts between gearbox and driving axle of a motor vehicle comprising a roller bearing having rollers, a cylindrical inner bearing ring pressable onto a lay shaft of the divided line of shafts and movable freely in axial direction relative to the rollers, a pair of packing rings cooperating with the inner bearing ring for sealing the roller bearing, the pair of packing rings and the inner bearing ring being accommodated in a bearing holder ring, an elastic ring supporting the bearing holder ring in a bearing casing securable to the motor vehicle, the elastic ring being formed of elastomeric material so as to afford axial, radial and angular movements of the bearing holder ring relative to the bearing casing, the elastic ring being in the shape of a tire having a substantially cylindrical main body enclosing the bearing holder ring and having at both axial ends thereof a respective ring of radially extending bracing projections prestressed by the bearing casing and an annular rib located between the rings of bracing projections and being radially spaced from the bearing casing.

Normally, the bearing is braced in the bearing casing only by means of the bracing projections which are prestressed. By suitably selecting the cross-section of these bracing projections, it is possible to impart any desired damping characteristic to the intermediate bearing. The annular rib comes into abutting engagement with the bearing casing only when the intermediate bearing carries out relatively great oscillating movements thereby assuring a sharply rising radial rigidity of the elastic tire for relatively great radial movements.

For the natural or inherent frequency of the bearing to remain at the lowest level possible, it is advantageous in accordance with another feature of the invention to provide a recess, elongated in peripheral direction, in the two end faces of the elastic tire, at the base of each bracing projection.

Other features which are considered as characteristic for the invention are set forth in the appended claims.

Although the invention is illustrated and described herein as embodied in intermediate bearing for supporting a divided line of drive shafts in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of of specific embodiments when read in connection with the accompanying drawings, in which.

Figure 1:
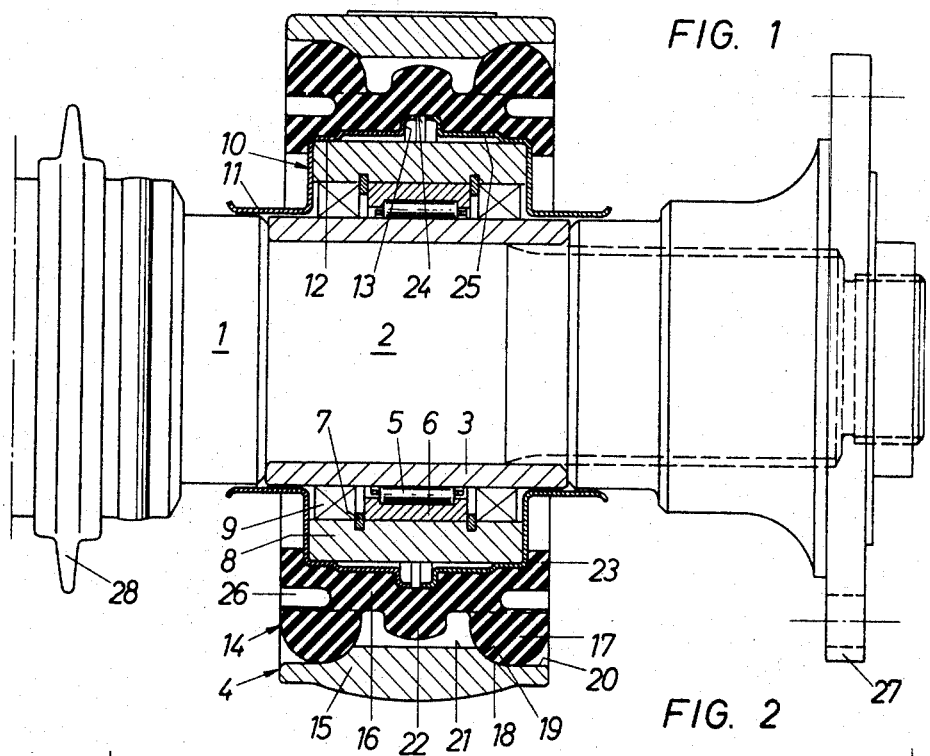
FIG. 1 is a longitudinal sectional view of an intermediate bearing constructed in accordance with the invention and fitted on a lay shaft.
Figure 2:
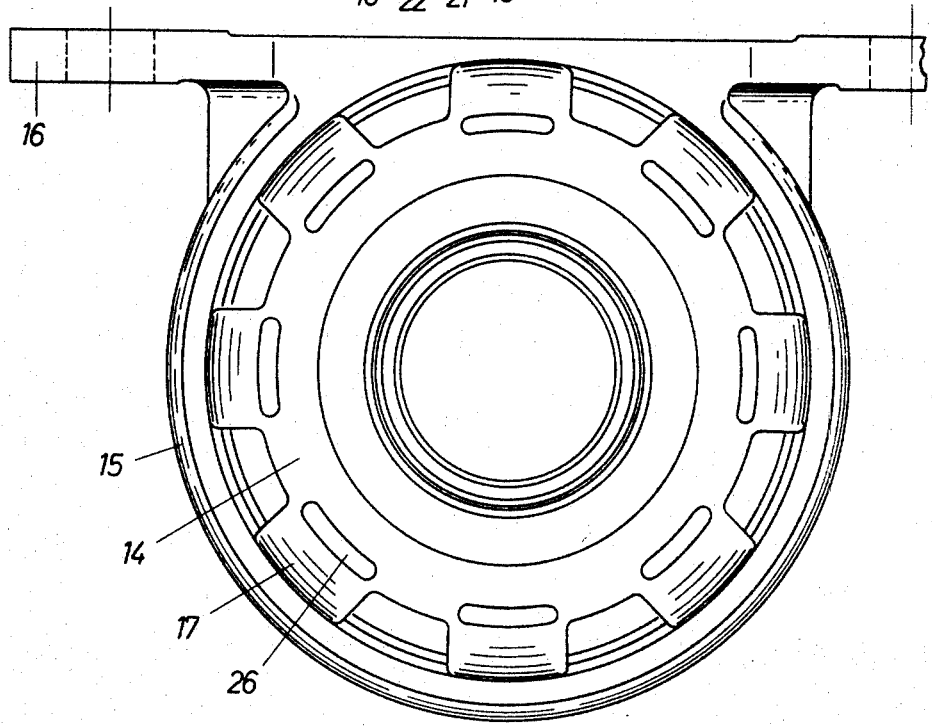
FIG. 2 is an end view of the intermediate bearing.
Figure 3:
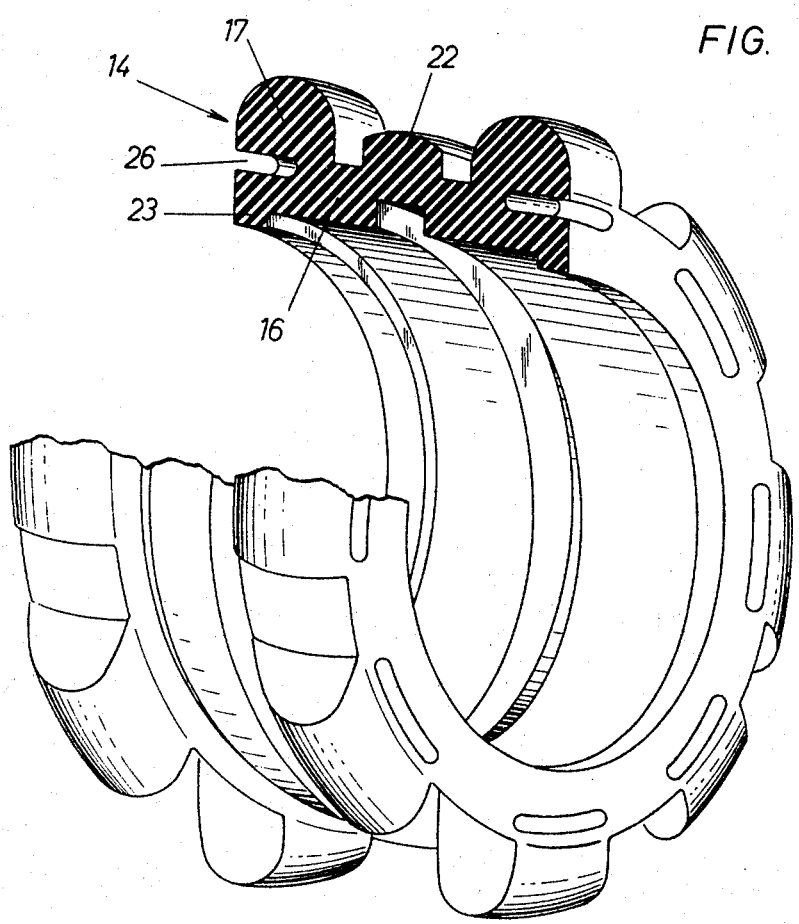
FIG. 3 is a perspective view, partially cut away, of an elastic tire of the intermediate bearing.

Referring now to the drawing, there is shown the rear end 1 of the first section of a divided triple-jointed line of drive shafts in a motor vehicle. This first section is generally referred to as the lay shaft and is attached to the vehicle transmission or gear box by means of a suitable joint. On a reduced-diameter portion 2 of this lay shaft 1, there is press-fitted an inner bearing ring 3 of an intermediate bearing 4. This inner bearing ring 3 is formed of stainless steel and is shaped as a sleeve having a cylindrical outer face. On this outer face of the inner bearing ring 3, which forms the race of the bearing 4 there run rollers 5 of a roller bearing. An outer race 6 of the bearing is accomoodated between snap rings 7 in a bearing holder ring 8 that has the construction of a cylindrical bushing. Beyond the snap rings 7 in the bearing holder ring 8, there are packing rings 9 through which the inner bearing ring 3 extends and in which it runs so that the roller bearing is sealed toward the ends thereof, whereby a single lubrication of the bearing is sufficient for the lifetime thereof. The snap rings 7 are not absolutely required. The outer race 6 can also be secured by the sheet metal sleeves 10 through the packing rings 9 in the bearing holder ring 8, against axial displacement, the sleeves 10 being respectively pushed onto the ends of the bearing holder ring 8 and having axially outwardly thereof a cover flange 11 to cover that part of the working surface of the inner bearing ring 3 which projects from the packing rings 9. The cylindrical part 12 of each sheet metal ring 10 which is pushed on to the outer face of the bearing holder ring 8 has, on its axially inner end, a radially projecting collar 13, the outer end of which having a rounded edge. These collars 13 on the sheet metal rings 10, have a special purpose that will be explained hereinafter in greater detail.

An elastic tire 14 is drawn radially prestressed onto the two sheet metal rings 10. The tire 14 braces the bearing holder ring 8 in a bearing casing 15 which may be mounted on a cross member of the frame of a vehicle by means of a supporting bracket 16.

The elastic tire 14 has a substantially cylindrical basic body 16 enclosing the sheet metal ring 10. Provided at each of the two ends of this basic body 16 is a ring of radially extending bracing projections 17 which are distributed at regular intervals over the periphery of the elastic tire 14. The bracing projections 17 have a substantially circular outer contour when considered in axial section. A part 8 of the outer face of the projection 17 which is directed toward the middle of the bearing is braced on a correspondingly concave face 19 of a widening or diametrically enlarging portion 20 of the bore 21 in the bearing casing 15 which opens towards the axial ends of the bearing casing 15. An annular rib 22 is formed on the outside of the basic body 16 of the elastic tire. Clearance is provided within the bore 21 of the bearing casing 15 between the rib 22 and the inner surface of the bearing casing.

In order to fix the elastic tire 14 with respect to the sheet metal rings 10 and the bearing holder ring 8, the elastic tire 14 is provided at each axial end thereof with a radially inwardly projecting flange 23 which is prestressed to bear on the end of the adjacent metal ring 10. Furthermore, the elastic tire is formed with an annular groove 24 on its inner face, in the middle thereof opposite the annular rib 22. The aforementioned radially outwardly projecting collars 13 of the two sheet metal rings 10 bear on the lateral walls of this annular groove 24. Thus, they likewise help to secure the elastic tire 14 in position relative to the sheet metal rings 10 and the bearing holder ring 8. At the same time, the collars 13 fulfill the further task of supporting or bracing the elastic tire 14 farther our radially in the region of the annular rib 22, so that the wall thickness of the elastic tire 14 in the region of the annular rib 22 is of the desired value for providing radial rigidity In order to obtain as soft a damping of small oscillations as possible, and also a relatively good angular mobility of the bearing, the bracing projections 17 must have considerable resilience. It is this property which determines the distance between the bearing holder ring 8 or sheet metal rings 10 and the bearing casing 15. At the great radial distance required for this, the annular rib 22 would be too high and therefore would not have adequate radial rigidity, since the clearance or spacing of the annular rib 22 with respect to the bore 21 of the bearing casing 15 must not be too large. In the axially inner zone of a part of the sheet metal rings 10 that is located on the outside of the bearing holder ring 8, there is provided a portion 25 which is spaced from the outer face of the bearing holder ring 8 such that the collars 13 are resilient in radial direction, which assists or promotes the progressive rigidity of the annular rib 22.

In order to increase the resilience of the bracing projections 17, a peripherally elongated recess 26 is provided in the end face of the elastic tire 14, at the foot of each bracing projection. Due to the greater resilience of the bracing projections 17 which is obtained by providing these recesses 26, the inherent frequency of the bearing shifts toward lower rotational rates. Moreover, the angular mobility of the bearing is thereby improved.

Since clearance must be provided between the cover flanges 11 and the working surface of the inner bearing 3, it is possible for dirt to penetrate into the clearance. At the righthand end (as viewed in FIG. 1) of the intermediate bearing, the clearance gap or space is protected against the penetration of dirt which may be thrown up by the vehicle wheels by a large flange 27 employed for attaching the rear portion of the drive shaft. For the same purpose, a rubber guard ring 28 is fitted on the lay shaft 1, at the left-hand end (as viewed in FIG. 1) of the intermediate bearing.

We claim:

1. Intermediate bearing for supporting a divided line of drive shafts between gear box and driving axle of a motor vehicle comprising a roller bearing having rollers, a cylindrical inner bearing ring pressable onto a lay shaft of the divided line of shafts, a pair of packing rings cooperating with said inner bearing ring for sealing said roller bearing, said pair of packing rings and said inner bearing ring being accommodated in a bearing holder ring, an elastic ring supporting said bearing holder ring in a bearing casing securable to a motor vehicle, said elastic ring being formed of elastomeric material so as to afford axial and angular movements of said bearing holder ring relative to said bearing casing, said elastic ring being in the shape of a tire having a substantially cylindrical main body enclosing said bearing holder ring and having at both axial ends thereof a respective ring of radially extending bracing projections prestressed by said bearing casing and an annular rib located between said rings of bracing projections and being radially spaced from said bearing casing.

2. Intermediate bearing according to claim 1 wherein a recess elongated in peripheral direction of said elastic ring is formed in each end face of said elastic ring at the foot of each of said bracing projections.

3. Intermediate bearing according to claim 1 wherein said bearing casing is open at the axial ends thereof and has a bore widening in diameter at said axial ends, the widening parts of said bore having a concave surface, said bracing projections having a substantially circular outer contour as viewed in axial section, part of the outer face thereof extending toward the center of the bearing being braced, on the correspondingly concave surface of a respective widening bore part.

4. Intermediate bearing for supporting a divided line of drive shafts between gear box and driving axle of a motor vehicle comprising a roller bearing having rollers, a cylindrical inner bearing ring pressable onto a lay shaft of the divided line of shafts, a pair of packing rings cooperating with said inner bearing ring for sealing said roller bearing, said pair of packing rings and said inner bearing ring being accommodated in a bearing holder ring, an elastic ring supporting said bearing holder ring in a bearing casing securable to a motor vehicle, said elastic ring being formed of elastomeric material so as to afford axial and angular movements of said bearing holder ring relative to said bearing casing, said elastic ring being in the shape of a tire having a substantially cylindrical main body enclosing said bearing holder ring and having at both axial ends thereof a respective ring of radially extending bracing projections prestressed by said bearing casing and an annular ring located between said rings of bracing projections and being radially spaced from said bearing casing, said bearing holder ring having the structure of a cylindrical bushing, and including sheet metal rings press-fitted onto said bearing holder ring, said elastic ring being fitted with prestressing on said sheet metal rings, said sheet metal rings having radially projecting collars respectively received in an annular groove on the inner surface of said elastic ring and bearing on a side wall thereof.

5. Intermediate bearing according to claim 4, wherein only one annular groove is located centrally on the inner surface of said elastic ring in the region of said annular rib, said radially projecting collars of both said sheet metal rings being in bearing engagement with the two sidewall surfaces of said groove.

6. Intermediate bearing according to claim 4, wherein said inner bearing ring has a working surface, part of which projects out of said roller bearing, said sheet metal rings being formed with axially outwardly extending cover flanges for covering said part of said working surface.

7. Intermediate bearing according to claim 4, wherein said elastic ring is formed at each axial end thereof with a radially inwardly projecting flange, said flanges being in bearing engagement with the end face of the respective adjacent sheet metal ring.

* * * * *